United States Patent
Lin

(10) Patent No.: US 9,025,918 B2
(45) Date of Patent: May 5, 2015

(54) PHOTOELECTRIC COUPLING MODULE

(71) Applicant: Hon Hai Precision Industry Co., Ltd., New Taipei (TW)

(72) Inventor: I-Thun Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 59 days.

(21) Appl. No.: 13/916,591

(22) Filed: Jun. 13, 2013

(65) Prior Publication Data
US 2014/0153872 A1    Jun. 5, 2014

(30) Foreign Application Priority Data
Dec. 4, 2012   (TW) .............................. 101145398 A

(51) Int. Cl.
G02B 6/32 (2006.01)
G02B 6/42 (2006.01)

(52) U.S. Cl.
CPC .......................................... G02B 6/42 (2013.01)

(58) Field of Classification Search
USPC ............... 385/33, 37, 39, 40, 41, 43
See application file for complete search history.

(56) References Cited

U.S. PATENT DOCUMENTS

| | | | |
|---|---|---|---|
| 6,220,762 B1* | 4/2001 | Kanai et al. | 385/53 |
| 6,702,479 B2* | 3/2004 | Yang | 385/78 |
| 2009/0046981 A1* | 2/2009 | Margolin et al. | 385/70 |
| 2014/0064667 A1* | 3/2014 | Isenhour et al. | 385/76 |

* cited by examiner

*Primary Examiner* — Akm Enayet Ullah
(74) *Attorney, Agent, or Firm* — Novak Druce Connolly Bove + Quigg LLP

(57) ABSTRACT

A photoelectric coupling module includes a photoelectric board, a photoelectric lens module, and a jumper. The photoelectric board is configured for converting light rays into electrical signals or converting the electrical signals into the light rays. The photoelectric lens module is positioned on the photoelectric board and configured for reflecting the light rays. The jumper includes a fiber connector and two fasteners extending from one side of the fiber connector. The photoelectric lens module is locked between the fasteners and the fiber connector. The photoelectric lens module reflects the light rays emitting from the photoelectric board to the fiber connector or reflects the light rays emitting from the fiber connector to the photoelectric board.

10 Claims, 4 Drawing Sheets

PHOTOELECTRIC COUPLING MODULE

BACKGROUND

1. Technical Field

The present disclosure relates to photoelectric technologies and, particularly, to a photoelectric coupling module.

2. Description of Related Art

Photoelectric coupling modules are used for coupling photoelectric elements and optical fibers in optical connectors. The photoelectric coupling modules generally include a photoelectric lens module and a jumper coupled to the photoelectric lens module. The photoelectric lens module includes a reflective lens for reflecting light rays. The jumper defines a number of receiving holes for receiving optical fibers. To reduce insertion loss, alignment between the receiving holes, i.e., optical fibers, and the reflective lens is required. However, the photoelectric lens module may not be unstably connected to the jumper and, thus, the optical fibers may not align with the reflective lens, degrading quality of the photoelectric coupling module.

Therefore, it is desirable to provide a photoelectric coupling module, which can overcome the limitations described.

DETAILED DESCRIPTION

Embodiments of the disclosure will be described with reference to the drawings.

Figure 1:
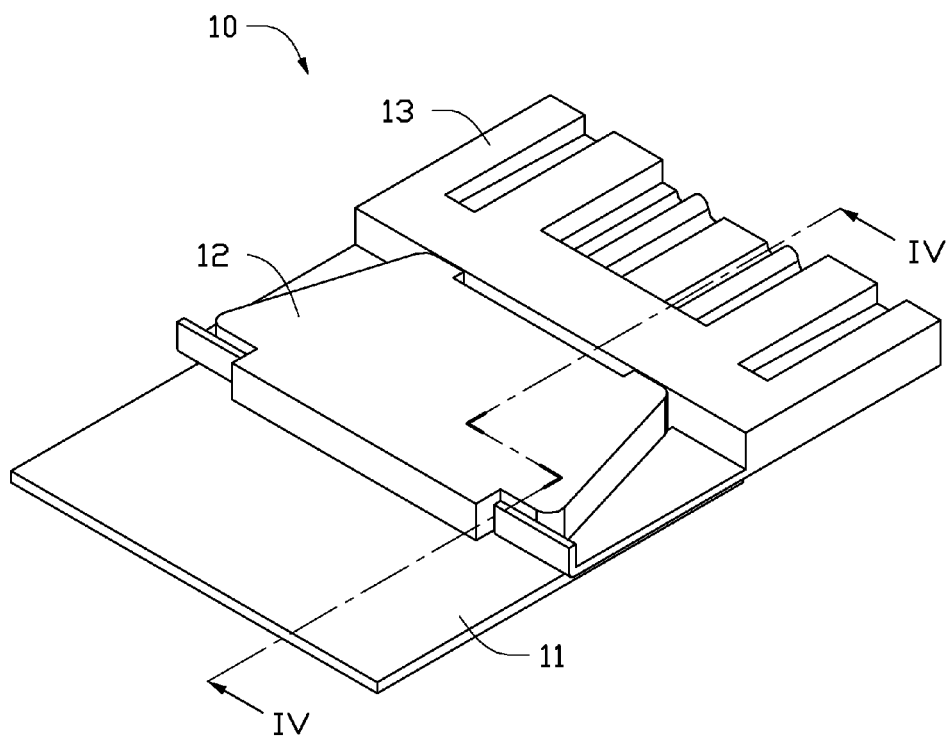
FIG. 1 is a schematic view of a photoelectric coupling module in accordance with an exemplary embodiment.
Figure 2:
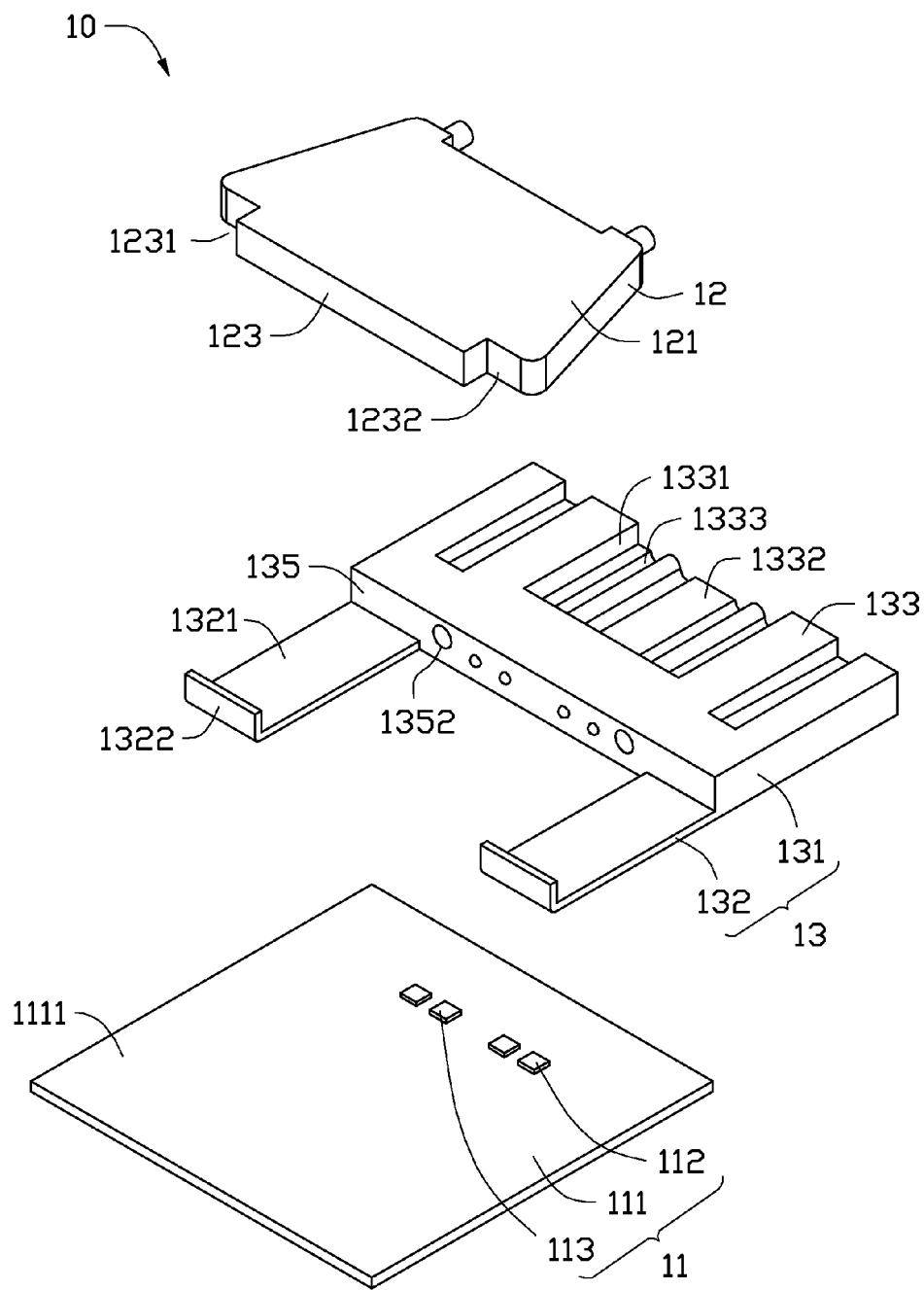
FIG. 2 is an isometric, exploded, and schematic view of the photoelectric coupling module of FIG. 1.
Figure 3:
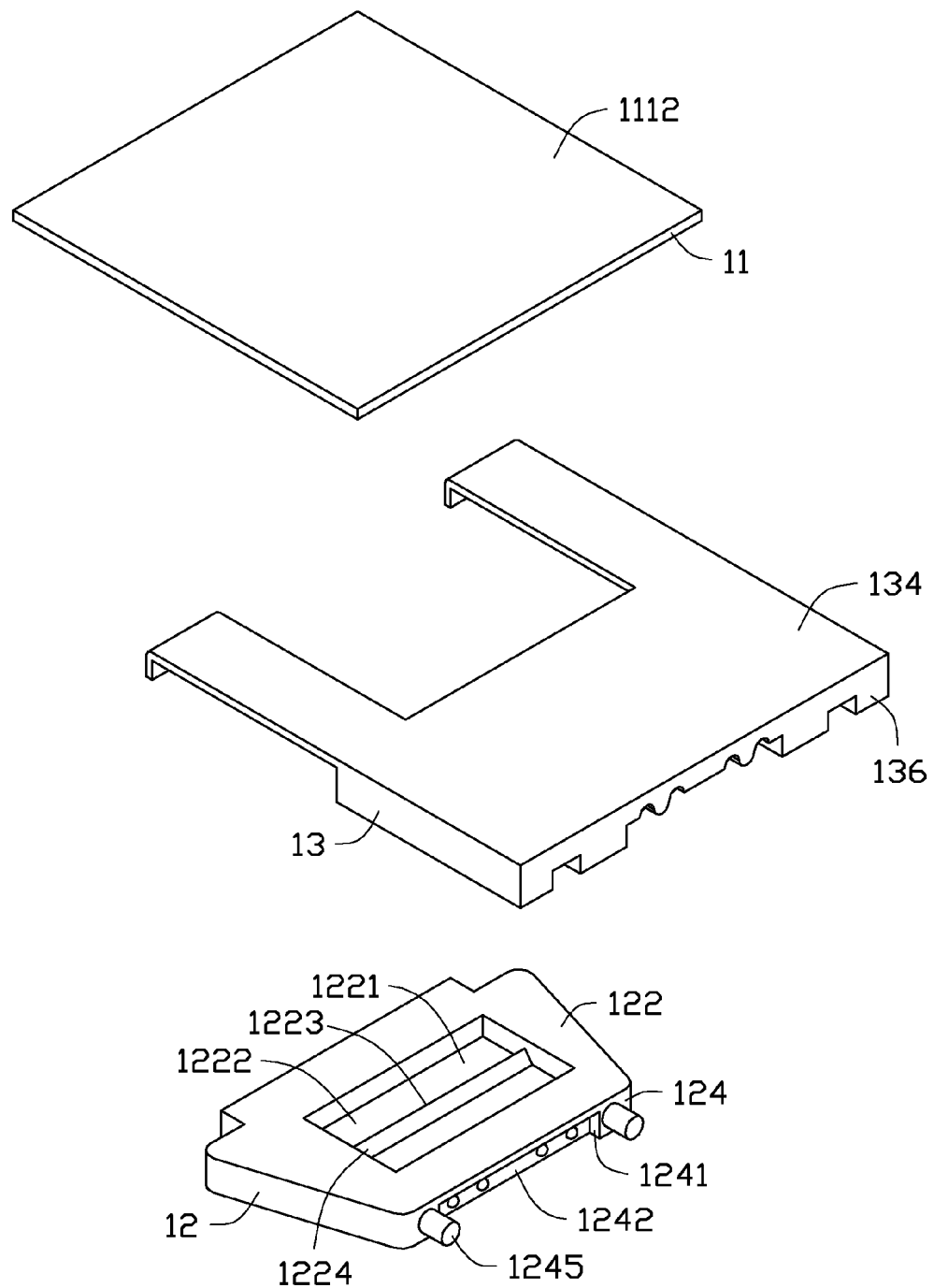
FIG. 3 is similar to FIG. 2, but viewed from another angle.
Figure 4:
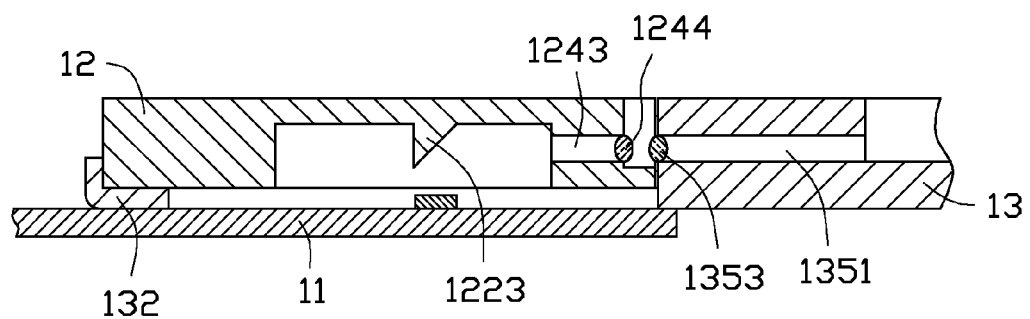
FIG. 4 is a cross-sectional view taken along a line IV-IV of FIG. 1.

FIGS. 1-4 show a photoelectric coupling module 10, according to an exemplary embodiment. The photoelectric coupling module 10 includes a photoelectric board 11, a photoelectric lens module 12, and a jumper 13.

The photoelectric board 11 includes a circuit board 111, a number of laser diodes 112, and a number of photo diodes 113. The circuit board 111 includes a first surface 1111 and a second surface 1112 opposite to the first surface 1111. The laser diodes 112 and the photo diodes 113 are positioned on the first surface 1111, and are electrically connected to the circuit board 111. The laser diodes 112 is configured for converting electrical signals to light rays, and the photo diodes 113 is configured for converting the light rays to the electrical signals. The laser diodes 112 and the photo diodes 113 are linearly arranged. In the embodiment, the photoelectric board 11 includes two laser diode 112 and two photo diodes 113.

The photoelectric lens module 12 is substantially rectangular, and includes a first upper surface 121, a first lower surface 122, a first left side surface 123, and a first right side surface 124. The first lower surface 122 is opposite to the first upper surface 121, and the first left side surface 123 is opposite to the first right side surface 124. The first left side surface 123 and the first right side surface 124 are connected between the first upper surface 121 and the first lower surface 122.

The photoelectric lens module 12 defines a first recess 1221 on the first lower surface 122. The first recess 1221 forms a first bottom surface 1222, which is substantially parallel with the first upper surface 121. A reflecting portion 1223 extends from the first bottom surface 1222. The reflecting portion 1223 includes a reflecting surface 1224 inclining from the first bottom surface 1222 towards the first lower surface 122 at about 45 degrees. The reflecting surface 1224 faces the first right side surface 124.

The photoelectric lens module 12 defines two position cutouts 1231 on the first left side surface 123. The two position recesses 1231 are positioned at two ends of the first left side surface 123. Each of the position cutouts 1231 forms a position surface 1232.

The photoelectric lens module 12 defines a second recess 1241 on the first right side surface 124. The second recess 1241 forms a second bottom surface 1242, which is substantially parallel with the first right side surface 124. The photoelectric lens module 12 defines a number of first through holes 1243 in the second bottom surface 1242. The first through holes 1243 communicate with the first recess 1221, and face the reflecting surface 1224. Each of the first through holes 1243 receives a first lens 1244 therein, and the first lens 1244 partially protrudes from the second bottom surface 1242. Two position poles 1245 are perpendicularly extended from the first right side surface 124, generally positioned on two sides of the second recess 1241. In the embodiment, the photoelectric lens module 12 includes four first through holes 1243.

The jumper 13 includes a fiber connector 131 and two fasteners 132. The fiber connector 131 includes a second upper surface 133, a second lower surface 134, a second left side surface 135, and a second right side surface 136. The second upper surface 133 is opposite to the second lower surface 134, and the second left side surface 135 is opposite to the second right side surface 136. The second left side surface 135 and the second right side surface 136 are connected between the second upper surface 133 and the second lower surface 134. The two fasteners 132 are positioned on the second left side surface 135.

The fiber connector 131 defines a third recess 1331 on the second upper surface 133. The third recess 1331 communicates the second right side surface 136. The third recess 1331 forms a third bottom surface 1332, which is substantially parallel with the second upper surface 133. The fiber connector 131 defines a number of receiving recesses 1333 on the third bottom surface 1332. The receiving recesses 1333 extend along a direction from the second left side surface 135 to the second right side surface 136. In the embodiment, the fiber connector 131 includes four receiving recesses 1333.

The fiber connector 131 defines a number of second through holes 1351 (see FIG. 4) and two position holes 1352 on the second left side surface 135. The second through hole 1351 extend along a direction from the second left side surface 135 to the second right side surface 136. The second through holes 1351 respectively communicate and align the receiving recesses 1333. The second through holes 1351 are positioned between the two position holes 1352. Each of the second through holes 1351 receives a second lens 1353 therein, and the second lens 1353 partially protrudes from the second left side surface 135. In the embodiment, the fiber connector 131 includes four second through holes 1351.

Each of the fasteners 132 includes a connecting portion 1321 and a locking portion 1322 connected to one end of the connecting portion 1321. The locking portion 1322 bends from the connecting portion 1321. The other end of the connecting portion 1321 facing way the locking portion 1322 is connected to the second left side surface 135. The two connecting portions 1321 are positioned at two sides of the position holes 1352, and generally adjacent to the second lower surface 134. The locking portion 1322 bends towards the second upper surface 133. The distance between the locking portion 1322 and the second left side surface 135 is equal to the distance between the position surface 1232 and the first right side surface 124.

During assembling, the photoelectric lens module 12 is fastened by the fasteners 132, and is locked between the locking portions 1322 and the second left side surface 135 of the jumper 13. The locking portions 1322 lock in the position cutouts 1231 and contact with the position surfaces 1232. The two position poles 1245 of the photoelectric lens module 12 are received in the position holes 1352 of the fiber connector 131. The first right side surface 124 faces the second left side surface 135. The first lenses 1244 are respectively aligned to the second lenses 1353. The first lower surface 122 of the photoelectric lens module 12 touches the connecting portions 1321 and faces the first surface 1111 of the circuit board 111. The reflecting surface 1224 faces the laser diodes 112 and the photo diodes 11.

In use, a number of optical fibers (not shown) are respectively received in the receiving recesses 1333 and the second through holes 1351. The optical fibers are respectively aligned with the second lenses 1353. Light rays emitting from the optical fibers penetrate the second lenses 1353 and the first lenses 1244, and project on the reflecting surface 1224. The reflecting surface 1224 reflects the light rays to the photo diodes 113. The photo diodes 113 convert the light rays into electrical signals. The electrical signals are output to the circuit board 111 through the photo diodes 113.

When the electrical signals are output to the laser diodes 112 from the circuit board 111, the laser diodes 112 convert the electrical signals into the light rays. The laser diodes 112 emit the light rays to the reflecting surface 1224. The reflecting surface 1224 reflects the light rays to the first lenses 1224. The light rays penetrate the first lenses 1224 and the second lenses 1353, and project to the optical fibers.

In other embodiments, the position poles 1245 can be positioned on the jumper 13, and the position holes 1352 can be defined on the photoelectric lens module 12.

As the photoelectric lens module 12 can be steadily locked by the jumper 13 by the fasteners 132 and the position holes 1352 accommodating the position poles 1245, the reliability of the photoelectric coupling module 10 is ensured.

Particular embodiments are shown and are described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A photoelectric coupling module, comprising:
    a photoelectric board configured for converting light rays into electrical signals or converting the electrical signals into the light rays;
    a photoelectric lens module positioned on the photoelectric board and configured for reflecting the light rays; and
    a jumper comprising a fiber connector and two fasteners extending from one side of the fiber connector, the photoelectric lens module being locked between the fasteners and the fiber connector;
    wherein the photoelectric lens module reflects the light rays emitting from the photoelectric board to the fiber connector or reflects the light rays emitting from the fiber connector to the photoelectric board.

2. The photoelectric coupling module of claim 1, wherein the photoelectric board comprises a circuit board, a plurality of laser diodes, and a plurality of photo diodes; the laser diodes and the photo diodes are positioned on the circuit board; the laser diodes is configured for converting the electrical signals into the light rays, and the photo diodes is configured for converting the light rays into the electrical signals.

3. The photoelectric coupling module of claim 2, wherein the photoelectric lens module defines a first recess and a plurality of first through holes communicating with the first recess, the photoelectric lens module comprises a reflecting portion obliquely extending from a first bottom surface of the first recess, the reflecting portion comprises a reflecting surface facing the first through holes, the laser diodes, and the photo diodes, and the photoelectric lens module comprises a plurality of first lenses respectively received in the first through holes.

4. The photoelectric coupling module of claim 3, wherein the fiber connector defines a plurality of second through holes, each of the first through holes is aligned with a respective one of the second through holes, the fiber connector comprises a plurality of second lenses respectively received in the second through holes, each of the first lenses aligns with a respective one of the second lenses.

5. The photoelectric coupling module of claim 4, wherein the photoelectric lens module comprises a first left side surface and a first right side surface opposite to the first left side surface, the fiber connector comprises a second left side surface and a second right side surface opposite to the second left side surface, and the first right side surface faces the second left side surface.

6. The photoelectric coupling module of claim 5, wherein the photoelectric lens module comprises two position poles perpendicularly extending from the first right side surface, the fiber connector defines two position holes on the second left side surface, and the position poles are received in the position holes respectively.

7. The photoelectric coupling module of claim 6, wherein the two fasteners are positioned on the second left side surface, and the two fasteners are positioned at two sides of the position holes.

8. The photoelectric coupling module of claim 6, wherein each of the fasteners comprises a connecting portion and a locking portion bending from one end of the connecting portion, and the other end of the connecting portion facing away from the locking portion is connected to the second left side surface.

9. The photoelectric coupling module of claim 8, wherein the photoelectric lens module defines two position cutouts at two ends of the first left side surface, each of the position cutouts forms a position surface, and the locking portions lock in the position cutouts and contact with the position surfaces.

10. The photoelectric coupling module of claim 9, wherein a distance between the locking portions and the second left side surface is equal to a distance between the position surfaces and the first right side surface.

* * * * *